(12) United States Patent
Emori et al.

(10) Patent No.: US 7,842,224 B2
(45) Date of Patent: Nov. 30, 2010

(54) VACUUM FORMING APPARATUS AND VACUUM FORMING METHOD

(75) Inventors: Norio Emori, Hanyu (JP); Akira Saitou, Kounosu (JP)

(73) Assignee: Calsonic Kansei Corporation, Saitama (JP)

( * ) Notice: Subject to any disclaimer, the term of this patent is extended or adjusted under 35 U.S.C. 154(b) by 71 days.

(21) Appl. No.: 12/175,792

(22) Filed: Jul. 18, 2008

(65) Prior Publication Data
US 2009/0039539 A1 Feb. 12, 2009

(30) Foreign Application Priority Data
Aug. 6, 2007 (JP) .............................. 2007-203919

(51) Int. Cl.
*B29C 43/56* (2006.01)
(52) U.S. Cl. ................. 264/553; 264/322; 264/46.8; 425/112; 425/386
(58) Field of Classification Search ............... 264/319, 264/46.8, 553, 322; 425/388, 112
See application file for complete search history.

(56) References Cited

U.S. PATENT DOCUMENTS

| | | | | |
|---|---|---|---|---|
| 3,146,143 A | * | 8/1964 | Bolesky et al. ............... | 156/212 |
| 3,600,746 A | * | 8/1971 | Kostur et al. ..................... | 26/1 |
| 4,666,544 A | | 5/1987 | Whiteside et al. | |
| 4,944,668 A | * | 7/1990 | Asano et al. ................. | 264/322 |
| 5,578,158 A | * | 11/1996 | Gutowski et al. ........... | 156/285 |
| 2001/0022413 A1 | * | 9/2001 | Oono et al. ................. | 264/267 |

FOREIGN PATENT DOCUMENTS

| | | |
|---|---|---|
| FR | 2 647 051 | 11/1990 |
| JP | H08-132518 | 5/1996 |
| JP | 10076570 A * | 3/1998 |
| JP | 2001-138389 A | 5/2001 |

OTHER PUBLICATIONS

JPO English machine translation of JP 2001-138389.*

* cited by examiner

*Primary Examiner*—Joseph S Del Sole
*Assistant Examiner*—Timothy Kennedy
(74) *Attorney, Agent, or Firm*—Global IP Counselors, LLP

(57) ABSTRACT

A vacuum forming apparatus has a forming die, a plurality of holding devices, a pressing device and a pair of supplemental holding devices. The forming die has at least one suction hole for creating a vacuum. The holding devices hold a resin sheet that has been softened by heating. The pressing device moves relative to the forming die to close a space therebetween and form an airtight state therebetween. Each of the supplemental holding devices includes a clamp member and a support member. The supplemental holding devices are movably arranged to move toward each other. The clamp members clamp the resin sheet on two sides of a selected sag area where the resin sheet will be made to sag. The support members extend along two side portions of the selected sag area for supporting a bottom surface of the resin sheet where the resin sheet will be made to sag.

4 Claims, 6 Drawing Sheets

VACUUM FORMING APPARATUS AND VACUUM FORMING METHOD

CROSS-REFERENCE TO RELATED APPLICATIONS

This application claims priority to Japanese Patent Application No. 2007-203919 filed on Aug. 6, 2007. The entire disclosure of Japanese Patent Application No. 2007-203919 is hereby incorporated herein by reference.

BACKGROUND OF THE INVENTION

1. Field of the Invention

The present invention generally relates to relates to a vacuum forming apparatus and a vacuum forming method for creating a vacuum between a resin sheet and a forming die by utilizing an air pressure difference on the front and back surfaces of the resin sheet to form the resin sheet into a shape.

2. Background Information

Vacuum forming apparatuses are known that pinch a heat-softened resin sheet between a forming die and a pressing device by creating a vacuum between the resin sheet and the forming die such that the resin sheet adheres closely to the forming die. For example, such a vacuum forming apparatus is disclosed in Japanese Laid-Open Patent Publication No. 2001-138389.

In order to prevent wrinkles from developing in the resin sheet, the vacuum forming apparatus of Japanese Laid-Open Patent Publication No. 2001-138389 holds two opposite sides of the resin sheet with a pair of clamps and then moves the clamps closer together before pinching the resin sheet between the forming die and the pressing device. As a result, the heat-softened resin sheet can be made to sag in a loose fashion before the forming die and the pressing device are pressed together.

In view of the above, it will be apparent to those skilled in the art from this disclosure that there exists a need for an improved vacuum forming apparatus. This invention addresses this need in the art as well as other needs, which will become apparent to those skilled in the art from this disclosure.

SUMMARY OF THE INVENTION

It has been discovered that in the vacuum forming device described above, the entire resin sheet sags because the clamps hold two opposite sides of the resin sheet as they moved closer together. Consequently, when a certain portion of the resin sheet is to be formed into a deep, narrow shape or into a complex shape, there is the possibility that that portion will become stretched thin or wrinkled.

The object of the present invention is to provide a vacuum forming apparatus and a vacuum forming method that can produce a comparatively large amount of sagging at a certain portion of a resin sheet and execute vacuum forming of the resin sheet while the resin sheet is in the state of having a comparatively large amount of sagging at a certain portion.

In order to achieve the aforementioned object, a vacuum forming apparatus is provided that basically comprises a forming die, a plurality of holding devices, a pressing device and a pair of supplemental holding devices. The forming die has at least one suction hole for creating a vacuum. The holding devices are configured to hold a resin sheet that has been softened by heating in order to be molded by the forming die. The pressing device is configured to be moved relative to the forming die to close a space between the forming die and the pressing device such that an airtight state is created between the resin sheet and the forming die. Each of the supplemental holding devices includes a clamp member configured to clamp the resin sheet and a support member configured to extend from the clamp member for supporting a bottom surface of the resin sheet. The supplemental holding devices is movably arranged to move toward each other. The clamp members are configured to clamp the resin sheet on two sides of a selected sag area where the resin sheet will be made to sag. The support members are configured to extend along two side portions of the selected sag area where the resin sheet will be made to sag.

The above object and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
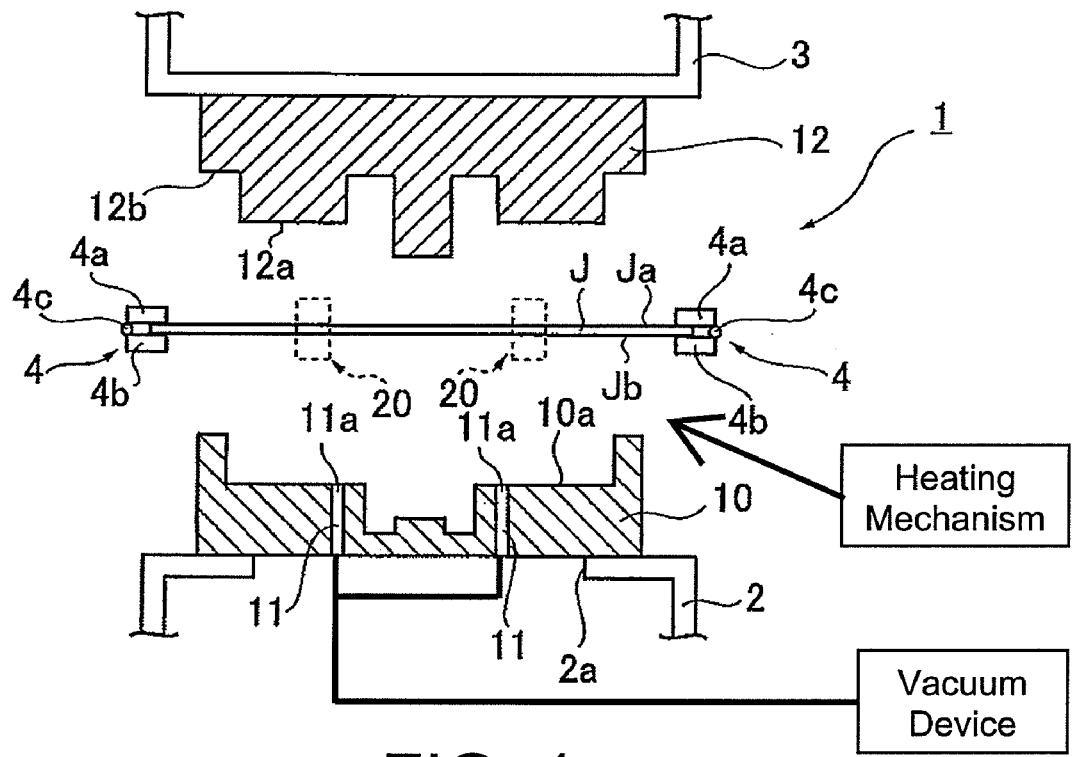
FIG. 1 is a simplified side elevational view of a vacuum forming apparatus in accordance with one preferred embodiment.

Referring initially to FIG. 1, a vacuum forming apparatus 1 is diagrammatically illustrated in accordance with one embodiment. The vacuum forming apparatus 1 basically includes a lower table 2, an upper table 3, a plurality of clamps 4, and a heating mechanism (diagrammatically shown). The lower table 2 can be moved up and down by a drive mechanism (not shown). The upper table 3 can be moved up and down by a drive mechanism (not shown). The clamps 4 constitute main holding devices for holding a resin sheet J. The heating mechanism is configured and arranged to heat the resin sheet J.

Figure 5:
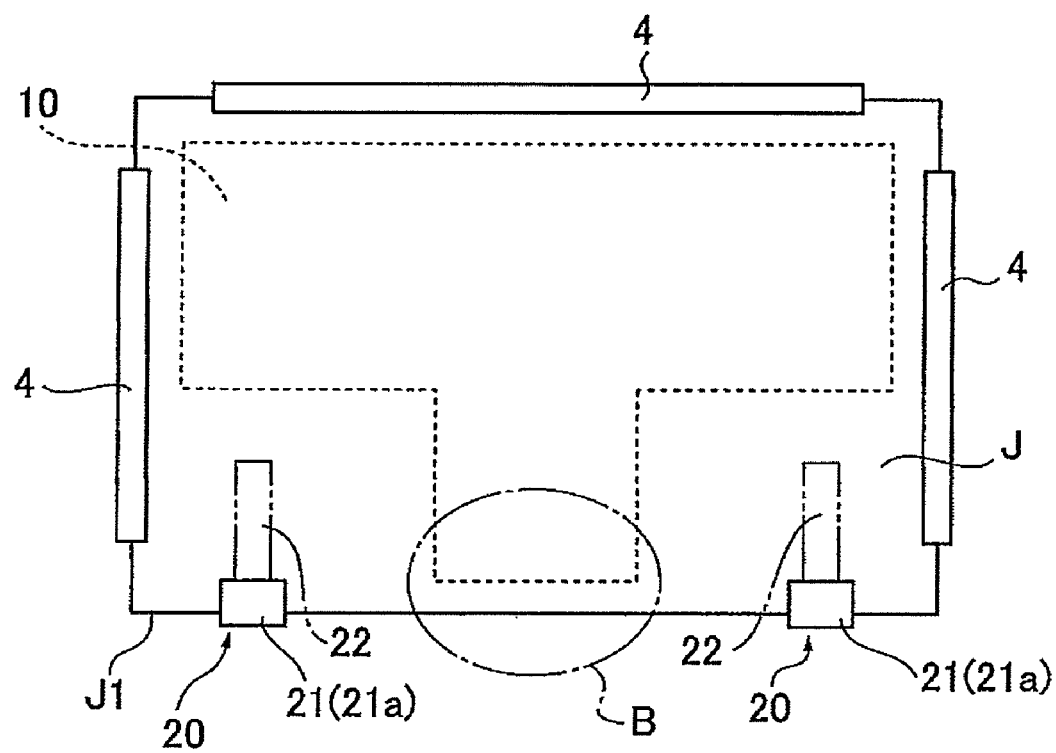
FIG. 5 is a simplified top plan view of the positioning of the resin sheet, the clamps, and the supplemental holding mechanisms.

A forming die 10 is fixed to the lower table 2. The forming die 10 is formed with a prescribed shaped that the resin sheet J will be formed into by having the resin sheet J be adhered closely thereto using a vacuum. In this embodiment, the forming die 10 is contrived to form the resin sheet J into the instrument panel 5 shown in FIG. 2. As shown in FIG. 5, the forming die 10 is generally T-shaped in a top plan view. A top surface 10a of the forming die 10 has a contour corresponding to the shape of the instrument panel 5.

Figure 2:
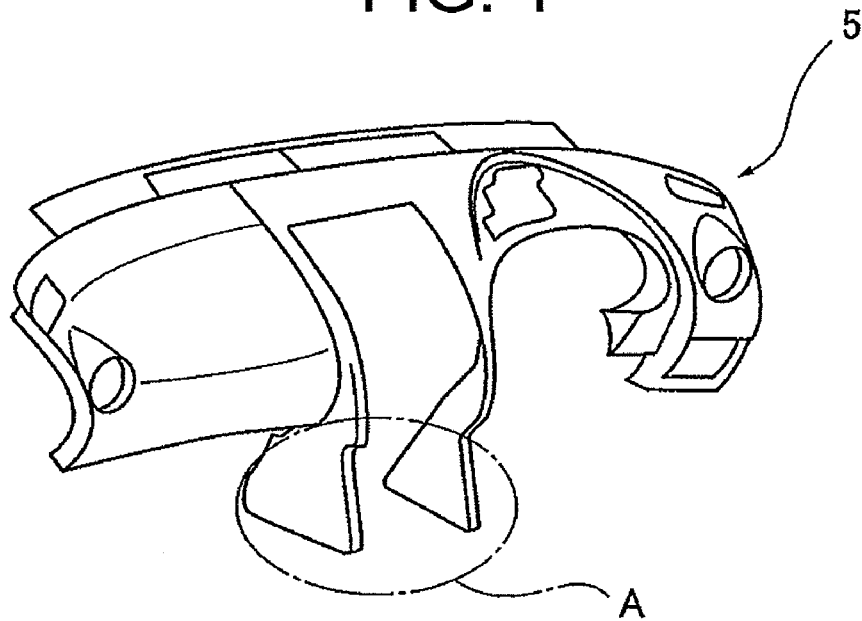
FIG. 2 is a perspective view of an instrument panel formed with the vacuum forming apparatus in accordance with the preferred embodiment.

As seen in FIG. 2, a middle lower edge portion A of the instrument panel 5 has a deep, narrow shape. Thus, the surface 10a of the forming die 10 has a deeply recessed portion corresponding to the middle lower edge portion A.

The forming die 10 is provided with a plurality of suction holes 11 for creating a vacuum. Each of the suction holes 11 passes through the forming die 10 with one end forming an opening 11a at the surface 10a of the forming die 10 and the other end being in communication with a vacuum device (diagrammatically shown in FIG. 1), e.g., vacuum pump or a vacuum tank.

An opening 2a that communicates with the vacuum device (not shown) is provided in the lower table 2 and the suction holes 11 communicate with the vacuum device through the opening 2a.

A pressing die (pressing device) 12 is arranged to be pressed against the forming die 10. The pressing die 12 constitutes a pressing device that is mounted to the upper table 3 such that it faces downwardly toward the forming die 10.

The pressing die 12 has a bottom surface 12a that generally follows the contour of the top surface 10a of the forming die 10. A perimeter portion 12b of the bottom surface 12a is configured to press the resin sheet J against the forming die 10 without any gaps such that the resin sheet J is in air-tight contact with the forming die 10.

Each of the clamps 4 includes an upper clamp 4a, a lower clamp 4b and a hinge mechanism 4c. The upper clamp 4a is arranged to press against an upper surface Ja of the resin sheet J. The lower clamp 4b is arranged to press against the upper clamp 4a so as to pinch the resin sheet J. The hinge mechanism 4c is arranged to pivotally connect the upper and lower clamps 4a and 4b together. The holding state of the clamp 4 is released by swinging the lower clamp 4b away from the upper clamp 4a, i.e., by swinging the lower clamp 4b downward in this embodiment.

As shown in FIG. 5, the clamps 4 are arranged on two opposite sides of the rectangular resin sheet J and on one of the sides that is perpendicular to the two sides. The held resin sheet J is first heated by the heating mechanism, and then positioned between the upper and lower tables 2 and 3. Once the held resin sheet J is heated and correctly positioned, the held resin sheet J is compressed between the forming die 10 and the pressing die 12. The clamps 4 are released after the forming die 10 and the pressing die 12 have been pressed together.

The resin sheet J is made of a thermoplastic and is molded into an instrument panel 5 by being heated and softened by the heating mechanism, made to adhere closely to the forming die 10, and then cooled. Although not shown in the figures, the heat-softened resin sheet J undergoes a so-called "draw down" phenomenon wherein a middle portion of the resin sheet J is pulled downward due to its own weight and causes the entire resin sheet J to sag.

Figure 3:
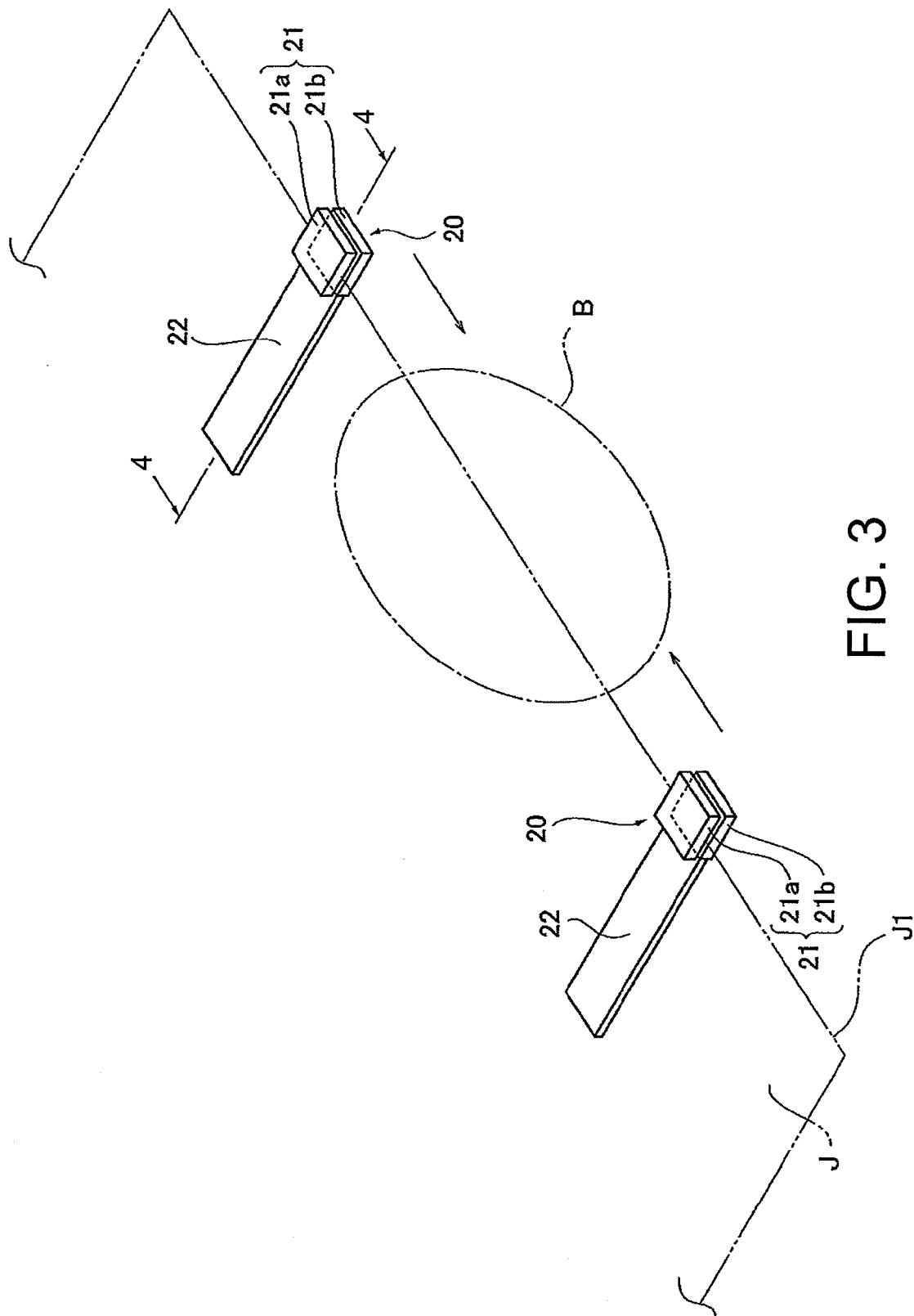
FIG. 3 is a simplified perspective view of a pair of supplemental holding mechanisms used in the vacuum forming apparatus of the illustrated embodiment.

As shown in FIGS. 3 and 5, the vacuum forming apparatus 1 has a pair of supplemental holding mechanisms 20 that constitute supplemental holding devices. The supplemental holding mechanisms 20 are configured and arranged such that they can be moved closer together. Each of the supplemental holding mechanisms 20 has a clamp member 21 and a support member 22. The clamp member 21 is configured and arranged to clamp onto the resin sheet J, while the support member 22 is configured and arranged to protrude from the clamp member 21 to support the heat-softened resin sheet J.

Figure 4:
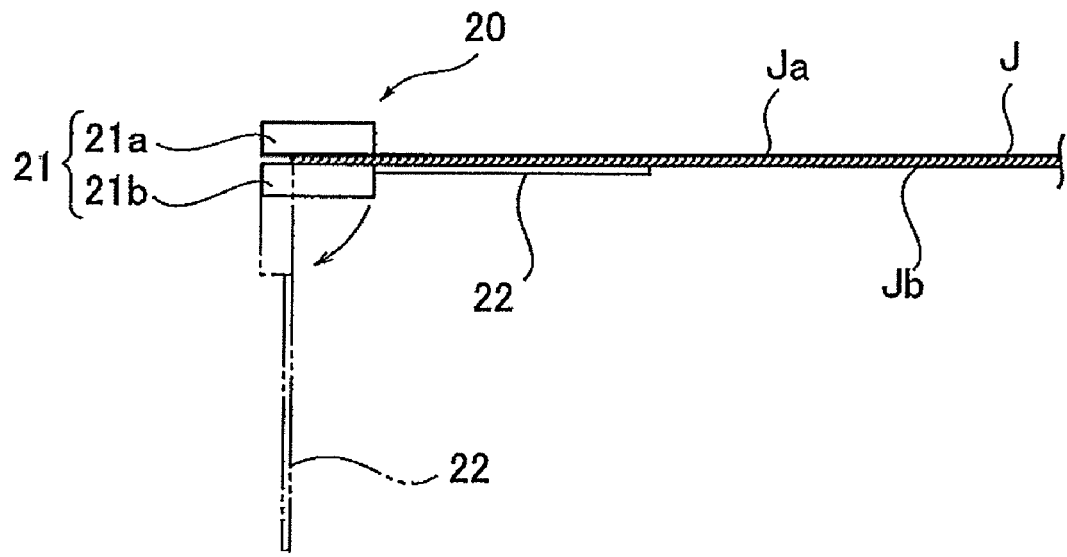
FIG. 4 is a simplified cross sectional view of the supplemental holding mechanism taken along a section line 4-4 of FIG. 3.

Each of the clamp members 21 has an upper clamp 21, a lower clamp 21b and a hinge mechanism (not shown). The upper clamp 21 is arranged to press against an upper surface Ja of the resin sheet J. The lower clamp 21b is arranged to press against the upper clamp 21a so as to pinch the resin sheet J. The hinge mechanism (not shown) is arranged to pivotally connect the upper and lower clamps 21a and 21b together. As shown in FIG. 4, the holding state of the clamp member 21 is released by swinging the lower clamp 21b away from the upper clamp 21a, i.e., by swinging the lower clamp 21b downward in this embodiment.

The clamp members 21 clamp the resin sheet J at adjacent portions on both sides of a selected sag area where the resin sheet will be made to sag. As shown in FIG. 5, the clamp members 21 clamp on the side J1 of the resin sheet J that is not held by the clamps 4. More specifically, the clamp members 21 clamp the side J1 on both sides of a middle portion B that will be made to sag. The middle portion B of the side J1 is the selected sag area of the resin sheet J that will be made to sag and corresponds to the middle lower edge portion A of the instrument panel 5. The middle portion B molded into a deep narrow shape during the vacuum molding.

Each of the support members 22 is a strip-shaped flat steel plate arranged to project from the lower clamp 21b of the respective clamp member 21 so as to extend toward the middle of the resin sheet J. The support members 22 and 22 extend along both side portions of the selected sag area where the resin sheet J will be made to sag for supporting the bottom surface Jb of the resin sheet J.

The support members 22 separate from the resin sheet J when the lower clamps 21b swing downward. Thus, the supporting of the resin sheet J by the support members 22 is released when the clamping of the resin sheet J by the clamp members 21 is released (see FIG. 4).

With the illustrated embodiment, the resin sheet J is clamped by the clamp members 21 of the supplemental holding mechanisms 20 at adjacent portions on two sides of a selected sag area where the resin sheet J will be made to sag and the clamp members 21 are moved closer to each other. As a result, a portion of the resin sheet J can be made to sag by a large amount. Additionally, since a bottom surface of the resin sheet J is supported by support members 22 along both side portions of the selected sag area where the resin sheet J is made to sag, the loads acting on both sides of the sag can be supported by the support members 22 even if a center portion of the sag is pulled downward greatly due to its own weight. By relieving the weight loads acting on two sides of the sag, a shape that matches the shape of the forming die 10 can be achieved and the resin sheet J can be prevented from developing wrinkles. As a result, vacuum forming of the resin sheet J can be executed with a certain portion of the resin sheet J in a state of having a comparatively large amount of sagging. Thus, the resin sheet J can be prevented from becoming stretched thin or developing wrinkles when a certain portion of the resin sheet J is formed into a deep, narrow shape or into a complex shape. Additionally, since the clamp members 21 and the support members 22 are released from the resin sheet J after the forming die 10 and the pressing device 12 have been pressed together, the supplemental holding mechanisms 20 do not get in the way during forming of the resin sheet J.

A vacuum forming method used with the vacuum forming apparatus 1 will now be explained.

First, the resin sheet J is held by the clamps 4 and the clamp members 21 of the supplemental holding mechanisms 20 with the resin sheet J being positioned between the upper and lower tables 2 and 3 as seen in FIG. 1. The resin sheet J is positioned over the support members 22 that extend from the clamp members 21 (FIG. 4).

A heating mechanism (not shown) is then arranged between the resin sheet J and the upper and lower tables 2 and 3 and the resin sheet J is heated and softened.

Figure 8:
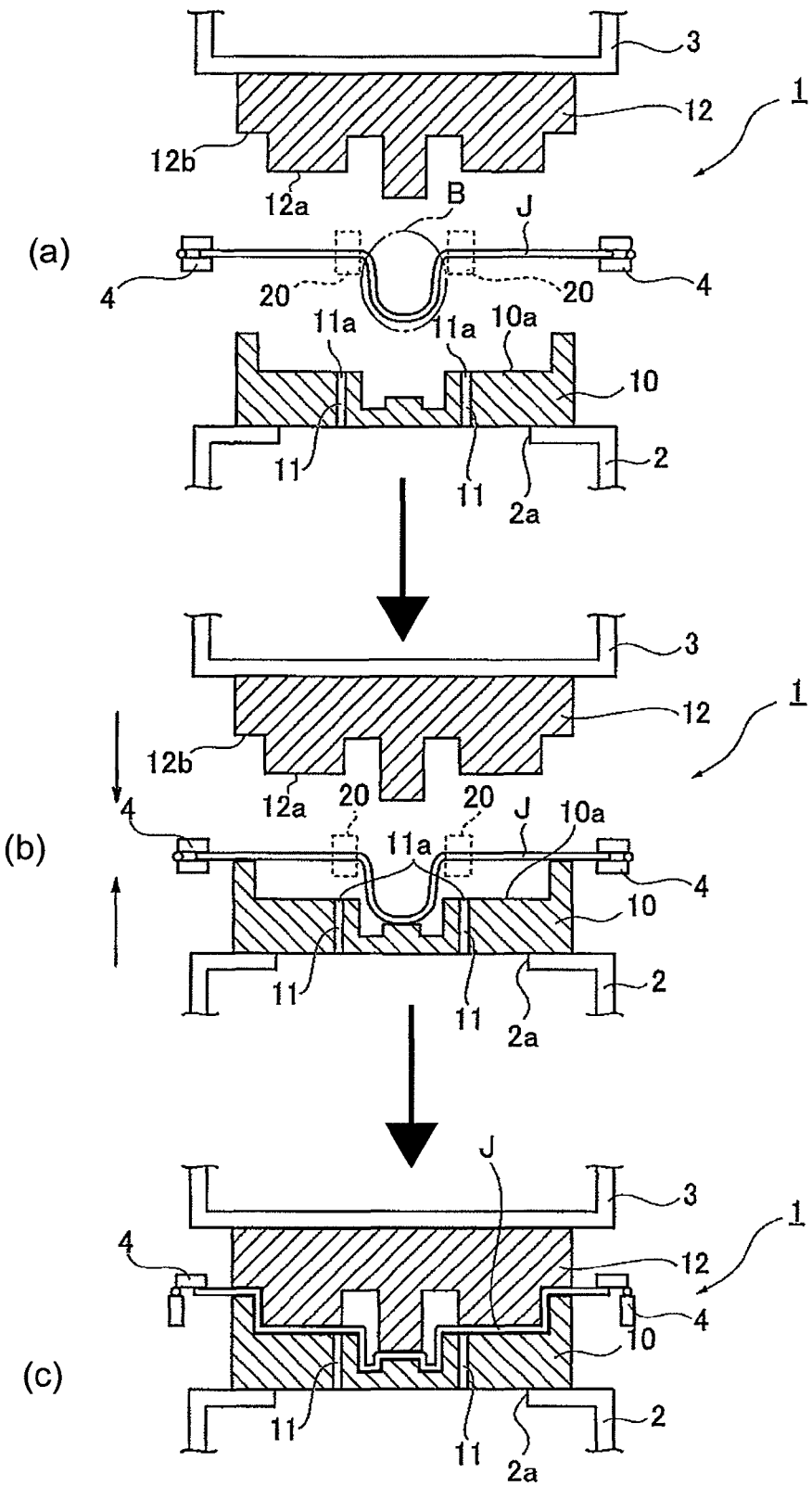
FIG. 8 is a series of simplified side elevational views (a) to (c) illustrating the steps of the vacuum forming method using the illustrated vacuum forming apparatus, with view (a) showing a state in which a sag has been created in the resin sheet, view (b) showing a state immediately before the upper and lower tables are moved and the forming die and pressing die are pressed together, and view (c) showing shows a state in which a vacuum is pulled and the clamps are released from the resin sheet.

After the heating mechanism is retracted, the two supplemental holding mechanisms 20 are moved closer together toward the middle portion B of the side J1 of the resin sheet J as shown in view (a) of FIG. 8.

Figure 6:
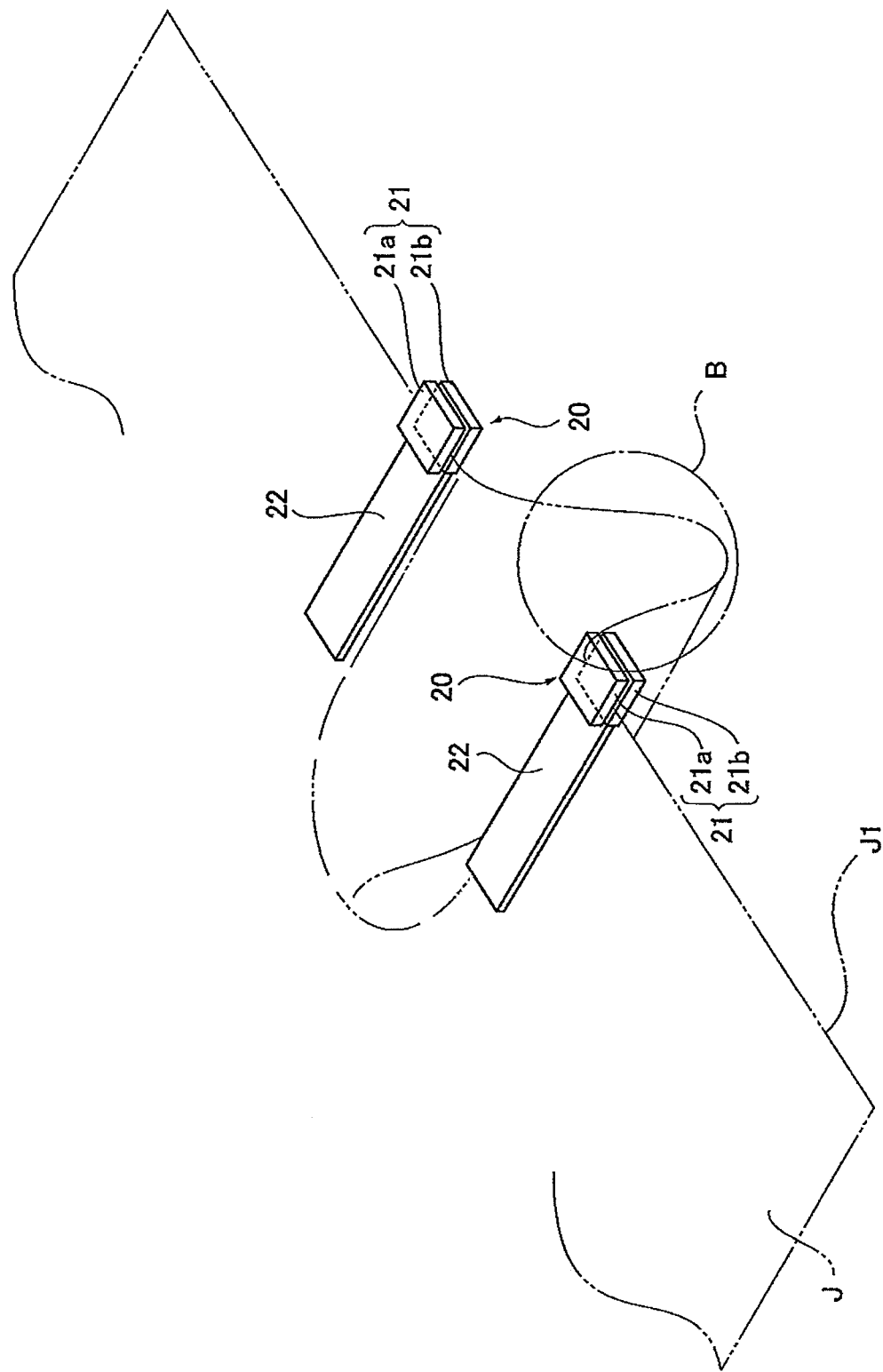
FIG. 6 is a perspective view of a pair of holding mechanisms showing a state in which the supplemental holding mechanisms have created a sag in the resin sheet.

Since the side J1 of the resin sheet J is held by the clamp members 21, the side J1 is pulled toward the middle portion B and the middle portion B of the side J1 sags (see FIG. 6).

Figure 7:
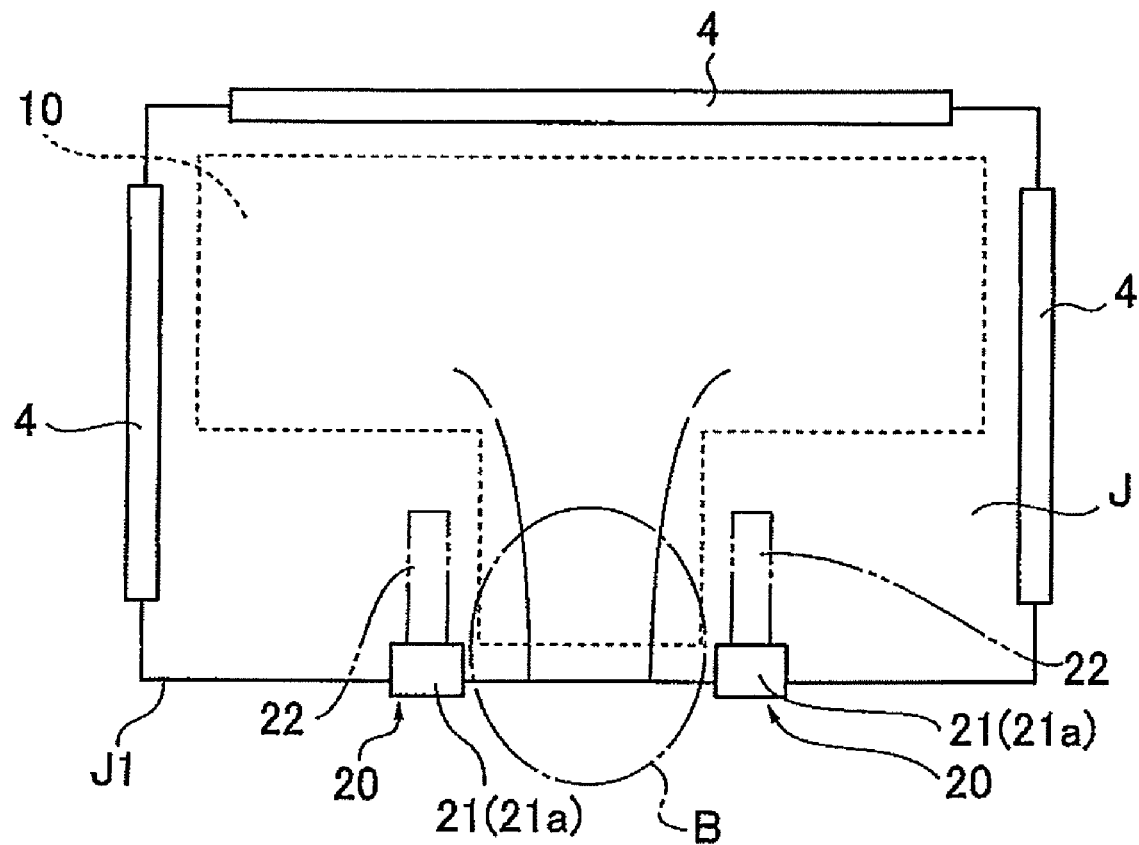
FIG. 7 is a top plan view of the positioning of the resin sheet, the clamps, and the supplemental holding mechanisms when a sag has been created in the resin sheet such as illustrated in FIG. 6.

Meanwhile, as shown in FIG. 7, the other three sides of the resin sheet J do not change shape because they are held by the clamps 4 and the portions near both side portions of the side J1 are stretched by the movement of the clamp members 21.

As a result, a comparatively large sag can be made to develop in the middle portion B of the side J1, which corresponds to the arbitrary portion of the resin sheet J. The bottom surface Jb of the resin sheet J is supported by the support members 22 on both sides of the sag. Consequently, the loads acting on both sides of the sag can be supported by the support members 22 even if a center portion of the sag is pulled downward greatly due to its own weight. By relieving the weight loads acting on two sides of the sag, the resin sheet J can be matched to the surface shape of the forming die 10 and the resin sheet J can be prevented from developing wrinkles.

Next, as shown in view (b) of FIG. 8, the lower table 2 is raised such that the softened resin sheet 10 is aligned with the top surface 10a of the forming die 10 and the upper table 3 is lowered such that the pressing die 12 is pressed against the forming die 10. Thus, the forming die and the pressing die 12 are pressed together with the resin sheet J pinched in-between. Since the perimeter portion 12b of the bottom surface 12a of the pressing die 12 is pressed closely against the forming die 10 with no gaps and with the resin sheet J pinched in-between, the resin sheet J and the forming die 10 are put into an airtight relationship. Since the supplemental holding mechanisms 20 are positioned so as not to interfere with the forming die 10 and the pressing die 12 (see FIG. 7), the forming die 10 and the pressing die 12 can be pressed together while continuing to hold the resin sheet J with the supplemental holding mechanisms 20.

After the dies 10 and 12 are pressed together, the vacuum device (not shown) draws air from between the top surface 10a of the forming die 10 and the bottom surface Jb of the resin sheet J. The air flows into the openings 11a and through the suction holes 11 and the opening 2a of the lower table 2. In this way, the resin sheet J is made to adhere closely to the top surface 10a of the forming die 10 and assumes the shape of an instrument panel 5.

Once the forming die 10 and the pressing die 12 are pressed together and the resin sheet J and the forming die 10 are airtight with respect to each other, the lower clamps 4b of all of the clamps 4 are swung downward as shown in view (c) of FIG. 8 such that the clamps 4 release the resin sheet J. Simultaneously with the release of the clamps 4, the supplemental holding mechanisms 20 are operated such that the clamp members 21 release their grip from resin sheet J and the support members 22 release their support of the resin sheet J. Since each of the support members 22 is formed as an integral part of a clamp member 21, the support members 22 separate from the resin sheet J when the lower clamps 21b of the clamp members 21 swing downward and away from the resin sheet J. Thus, the clamping performed by the clamp members 21 and the supporting performed by support members 22 are both released simultaneously.

Since the clamp members 21 and the support members 22 are released after the forming die 10 and the pressing die 12 are pressed together, the holding mechanism 20 does not get in the way during the forming of the resin sheet J.

Afterwards, the mechanisms 20 are moved away from each other and returned to an initial position (the position they were in before being moved closer together).

After a prescribed amount of time has elapsed, the lower table 2 is lowered and the upper table 3 is raised such that the molded resin sheet J can be removed from the forming die 10 and extracted from the vacuum forming apparatus 1.

Although, in the embodiment described above, the support members 22 separate from the resin sheet J when the lower clamps 21b of the clamp members 21 are swung downward, the invention is not limited to such a contrivance. For example, it acceptable for the support members 22 to be contrived such that they rotate laterally about centers located on the clamp members 21 in order to separate from the resin sheet J. Since the elongated support members 22 cannot be rotated in a height direction, space can be used efficiently in the height direction.

It is also acceptable for the release of the clamp members 21 not to be simultaneous with the separation of the support members 22 from the resin sheet J. The timing of the release of the clamp members 21 and the separation of the support members 22 can be adjusted according to the material from which the resin sheet J is made and the shape of the forming die 10 so as to obtain optimum forming conditions.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vacuum forming apparatus comprising:
    a forming die having at least one suction hole for creating a vacuum;
    a plurality of holding devices configured to hold at least two opposite sides of a resin sheet that has been softened by heating in order to be molded by the forming die;
    a pressing device configured to be moved relative to the forming die to close a space between the forming die and the pressing device such that an airtight state is created between the resin sheet and the forming die; and
    a pair of supplemental holding devices disposed in two positions on one of the sides of the resin sheet extending between the two opposite sides held by the holding devices, with each of the supplemental holding devices including a clamp member configured to clamp the resin sheet and a support member configured to extend from the clamp member for supporting a bottom surface of the resin sheet, the supplemental holding devices being movably arranged to move toward each other along the one of the sides of the resin sheet extending between the two opposite sides held by the holding devices to form a localized sag area between the two positions where the resin sheet will be made to locally sag in a part of the one of sides of the resin sheet extending between the two opposite sides held by the holding devices,
    the clamp members being configured to clamp the resin sheet in the two positions, and the support members being configured to extend from the two positions toward inside of the resin sheet along two side portions of the localized sag area to support loads acting on the two side portions of the localized sag area.

2. The vacuum forming apparatus as recited in claim 1, wherein the supplemental holding devices are configured with respect to the forming die to be movable to release the clamping of the resin sheet by the clamp members and to stop supporting the bottom surface of the resin sheet by the support members after the forming die and the pressing device have been pressed together.

3. A vacuum forming method comprising:
    softening a resin sheet held by a plurality of holding devices in at least two opposite sides of the resin sheet;
    positioning the resin sheet between a pressing device and a forming die through heating;
    clamping the resin sheet in two positions adjacent to a selected area where the resin sheet will be made to locally sag, both of the two positions being disposed on one of sides of the resin sheet extending between the two opposite sides held by the holding devices;
    supporting a bottom surface of the resin sheet from the two positions toward inside of the resin sheet along two side portions adjacent the selected area where the resin sheet will be made to locally sag to support loads acting on the two side portions of the selected area; and
    moving the two positions of the resin sheet closer together along the one of sides of the resin sheet extending between the two opposite sides held by the holding devices such that the selected area of the resin sheet is made to locally sag to form a localized sag area between the two side portions in a part of the one of the sides of the resin sheet extending between the two opposite sides held by the holding devices with the forming die and the pressing device being separated;
    moving the forming die and the pressing device relative to each other to press the resin sheet therebetween; and
    drawing a portion of the resin sheet to adhere closely against the forming die by creating a vacuum.

4. The vacuum forming method as recited in claim 3, wherein
    the clamping of the resin sheet is released and the supporting of the bottom surface of the resin sheet is stopped after the forming die and the pressing device have been pressed together.

* * * * *